United States Patent
Weaver et al.

(10) Patent No.: US 12,543,700 B2
(45) Date of Patent: Feb. 10, 2026

(54) SYSTEM AND METHOD FOR THREE-DIMENSIONAL KINEMATIC PROFILING OF ANIMAL MODELS

(71) Applicant: Duke University, Durham, NC (US)

(72) Inventors: Isaac Weaver, Durham, NC (US); James Roach, Durham, NC (US); Timothy Dunn, Durham, NC (US); Michael Tadross, Durham, NC (US)

(73) Assignee: Duke University, Durham, NC (US)

( * ) Notice: Subject to any disclaimer, the term of this patent is extended or adjusted under 35 U.S.C. 154(b) by 167 days.

(21) Appl. No.: 18/496,375

(22) Filed: Oct. 27, 2023

(65) Prior Publication Data
US 2024/0138367 A1    May 2, 2024

Related U.S. Application Data

(60) Provisional application No. 63/419,769, filed on Oct. 27, 2022.

(51) Int. Cl.
| | |
|---|---|
| *A01K 1/03* | (2006.01) |
| *A01K 29/00* | (2006.01) |
| *G06V 10/12* | (2022.01) |
| *G06V 40/20* | (2022.01) |
| *H04N 13/282* | (2018.01) |
| *H04N 23/20* | (2023.01) |
| *H04N 23/56* | (2023.01) |

(52) U.S. Cl.
CPC ............ *A01K 1/031* (2013.01); *A01K 29/005* (2013.01); *G06V 10/12* (2022.01); *G06V 40/20* (2022.01); *H04N 13/282* (2018.05); *H04N 23/20* (2023.01); *H04N 23/56* (2023.01)

(58) Field of Classification Search
CPC ...... A01K 1/031; A01K 29/005; G06V 10/12; G06V 20/52; G06V 2201/10; G06V 40/20; H04N 13/282; H04N 23/20; H04N 23/56

USPC .......................................................... 348/159
See application file for complete search history.

(56) References Cited

U.S. PATENT DOCUMENTS

| | | | | |
|---|---|---|---|---|
| 2005/0163349 A1* | 7/2005 | Brunner | ................ | A61B 5/1118 382/110 |
| 2008/0152192 A1* | 6/2008 | Zhu | ...................... | G06V 10/147 382/103 |

(Continued)

FOREIGN PATENT DOCUMENTS

WO    WO-2017135896 A1 *   8/2017    ............. G06T 7/557

OTHER PUBLICATIONS

Dunn et al., "Geometric deep learning enables 3D kinematic profiling across species and environments," Nature Methods, 2021, 18: 564-573.

*Primary Examiner* — Kathleen M Walsh
(74) *Attorney, Agent, or Firm* — Michael Best & Friedrich LLP

(57) ABSTRACT

An observation chamber for three-dimensional kinematic profiling of subject animals. One example system for analyzing free-moving animal subject behavior includes a housing, a transparent arena configured to hold a subject, a camera mounted below the arena, and a mirror system configured to reflect multiple images of the subject in a single field of view of the camera. A height of the housing is less than 80 inches, and a width of the housing is less than 32 inches. The system fits within standard doorway dimensions.

20 Claims, 18 Drawing Sheets
(4 of 18 Drawing Sheet(s) Filed in Color)

(56) References Cited

U.S. PATENT DOCUMENTS

| | | | |
|---|---|---|---|
| 2010/0111359 A1* | 5/2010 | Bai | A01K 29/005 |
| | | | 382/103 |
| 2010/0294947 A1* | 11/2010 | Oda | G01N 21/6456 |
| | | | 250/200 |
| 2012/0234256 A1* | 9/2012 | Harte | A01K 15/02 |
| | | | 119/421 |
| 2016/0270364 A1* | 9/2016 | Woolf | G06T 7/20 |
| 2018/0260645 A1* | 9/2018 | Roberson | G06V 10/141 |
| 2019/0080158 A1* | 3/2019 | Roberson | G06V 40/10 |
| 2020/0060225 A1* | 2/2020 | Roberson | A01K 1/031 |
| 2022/0248642 A1* | 8/2022 | Kumar | G06V 10/82 |

* cited by examiner

| Group: | A (n=10) | B (n=13) | C (n=13) | D (n=10) |
|---|---|---|---|---|
| Age (months): | 4 | | 13 | |
| Genotype: | WT or VPS35 (D620N) | WT or VPS35 (D620N) | WT or VPS35 (D620N) | WT or VPS35 (D620N) |

Genotype Blinded Cohorts

FIG. 13D

SYSTEM AND METHOD FOR THREE-DIMENSIONAL KINEMATIC PROFILING OF ANIMAL MODELS

CROSS-REFERENCE TO RELATED APPLICATIONS

This application claims priority to U.S. Provisional Patent Application No. 63/419,769, filed Oct. 27, 2022, the entire contents of which are hereby incorporated by reference.

STATEMENT REGARDING FEDERALLY SPONSORED RESEARCH

This invention was made with government support under 5R01NS107472-04 awarded by the National Institutes of Health. The government has certain rights in the invention.

FIELD

This disclosure relates to three-dimensional kinematic profiling of animals for laboratory research, and, more specifically, an observation chamber including a plurality of mirrors for three-dimensional kinematic profiling of animals for laboratory research.

INTRODUCTION

Behavioral phenotypes in animal models are an important tool in medical research. These are used in a wide variety of applications, ranging from drug reactions to detection and monitoring of disease. Documentation of behavior characteristics has historically been completed by hand, which is time consuming and subject to error and variability. Additionally, these historical behavioral assays were typically limited to gross metrics such as velocity, turning, and freezing.

Recent advances in computer vision and machine learning has attenuated these problems and illuminated previously unidentifiable nuances in behavior. However, these systems also have limitations. For example, some of these systems only permit restricted animal movement and views. This excludes the rich set of body poses composing natural animal (e.g., rodent) behavioral expression. Complex, non-walking behaviors, such as grooming, include contorted body poses with a high degree of self-occlusion and atypical body joint angles that are not captured by these types of systems. Other systems track only simplistic maneuvers and rely on features that are constantly visible from a single view. While there are some systems that are capable of full three-dimensional (3D) reconstruction of laboratory animals, these are highly complex systems that require the use of multiple cameras and are not feasible for use in practical applications.

In light of these and other limitations, there is an ongoing opportunity for improvement in the collection and analysis of animal behavior.

SUMMARY

The present disclosure provides embodiments of a system for three-dimensional kinematic profiling of animals.

One example system for analyzing free-moving animal subject behavior, includes a housing, wherein a height of the housing is less than 80 inches, and wherein a width of the housing is less than 32 inches, a transparent arena configured to hold a subject, a camera mounted below the arena, and a mirror system configured to reflect multiple images of the subject in a single field of view of the camera.

In some aspects, the mirror system includes four mirrors disposed orthogonally around the arena, and the camera is configured to capture five simultaneous views of the subject.

In some aspects, the system further includes a light source, wherein the light source is an infrared source, and wherein the camera is an infrared camera.

In some aspects, the camera is a first camera of a plurality of cameras, wherein each camera of the plurality of cameras is configured to capture multiple images of the animal.

In some aspects, the system further includes a lid covering the arena, wherein the lid includes a handle and a ventilation port.

In some aspects, the arena is a cubic arena including a base and four walls.

In some aspects, the four walls are tapered at an angle that aligns with a lens angle of the camera.

In some aspects, the base has an area of approximately 26 inches by 26 inches.

In some aspects, the arena has a height of approximately 36 inches.

In some aspects, the system further includes an electronic processor configured to receive, from the camera, video of the subject, analyze the video, and quantify an animal behavior based on the analyzed video.

In some aspects, the electronic processor is further configured to: generate metadata associated with the analyzed video, wherein the metadata includes at least one selected from the group consisting of an arena identification number, a date, an animal identification, and a duration of the analyzed video.

Another example system for analyzing free-moving animal subject behavior includes a housing including a frame, a top surface, and a support platform, a transparent arena configured to hold a subject, wherein the transparent arena is connected to the top surface, a camera mounted below the arena, a computing platform supported by the support platform, and a mirror system configured to reflect multiple images of the subject in a single field of view of the camera, wherein the mirror system surrounds the transparent arena.

In some aspects, the mirror system includes four mirrors disposed orthogonally around the arena, and the camera is configured to capture five simultaneous views of the subject.

In some aspects, the system further includes a light source configured to illuminate the arena, wherein the light source is an infrared source, and wherein the camera is an infrared camera.

In some aspects, the top surface includes a recess, and the subject accesses the arena via the recess.

In some aspects, the system further includes a lid configured to cover the recess.

In some aspects, the system further includes a second surface situated between the top surface and the support platform, wherein the camera is situated below the second surface.

In some aspects, the second surface includes a camera viewport.

In some aspects, the arena is a cubic arena including a base and four walls, and the four walls are tapered at an angle that aligns with a lens angle of the camera.

In some aspects, the computing platform includes an electronic processor configured to receive, from the camera, video of the subject, analyze the video, and quantify an animal behavior based on the analyzed video.

The disclosure provides for other aspects and embodiments that will be apparent in light of the following detailed description and accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying Figures, Examples, and Appendix are provided by way of illustration and not by way of limitation. The foregoing aspects and other features of the disclosure are explained in the following description, taken in connection with the accompanying example figures (also "FIG.") relating to one or more embodiments, in which:

FIGS. 13A-13D are graphs and tables associated with experimental data; and

DETAILED DESCRIPTION

Figure 1:
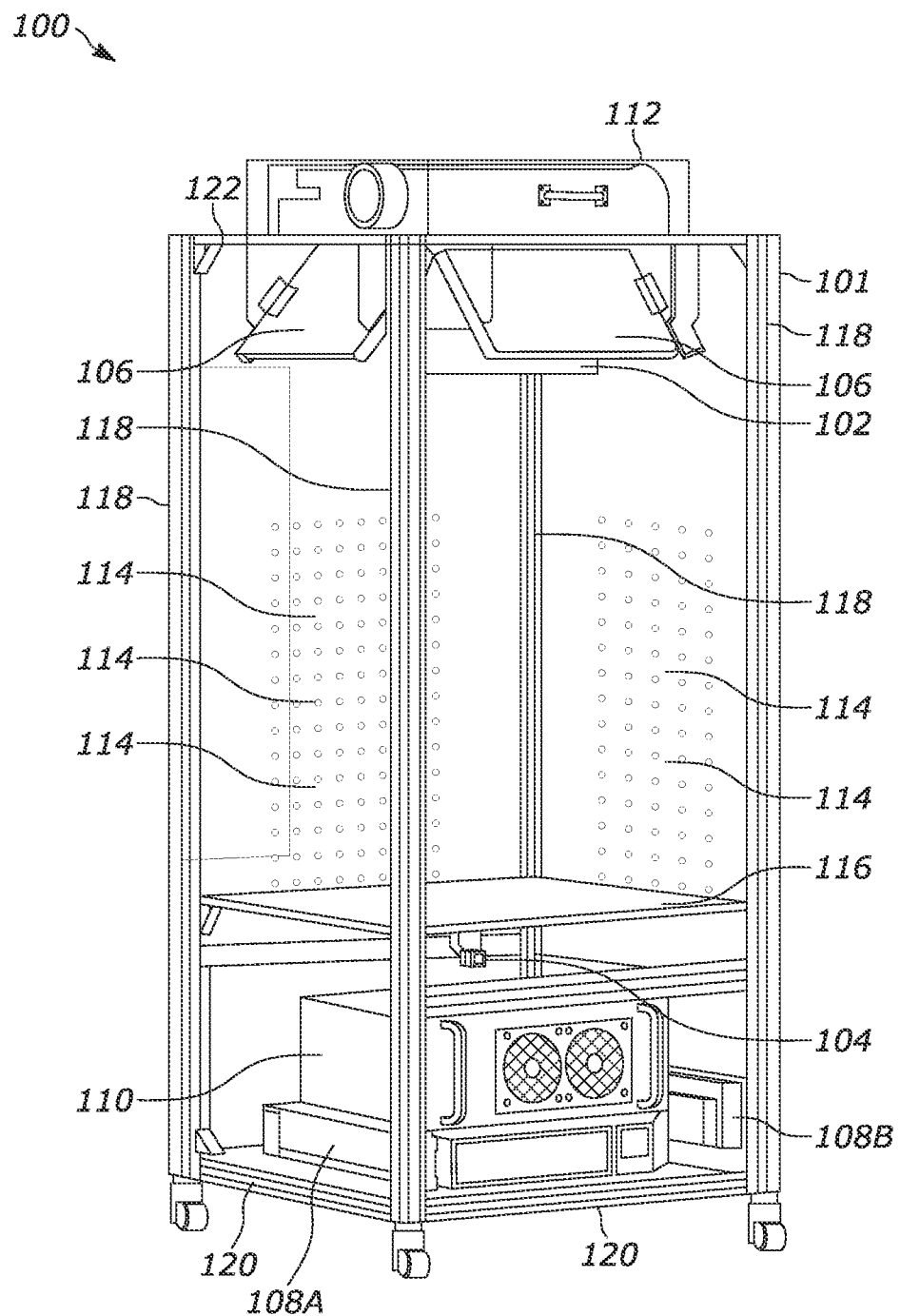
FIG. 1 is a cutaway assembly view of a system in accordance with one embodiment of the present disclosure.

For the purposes of promoting an understanding of the principles of the present disclosure, reference will now be made to embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "an element" means at least one element and can include more than one element.

"About" is used to provide flexibility to a numerical range endpoint by providing that a given value may be "slightly above" or "slightly below" the endpoint without affecting the desired result.

The use herein of the terms "including," "comprising," or "having," and variations thereof, is meant to encompass the elements listed thereafter and equivalents thereof as well as additional elements. As used herein, "and/or" refer to and encompasses any and all possible combinations of one or more of the associated listed items, as well as the lack of combinations where interpreted in the alternative ("or").

As used herein, the transitional phrase "consisting essentially of" (and grammatical variants) is to be interpreted as encompassing the recited materials or steps "and those that do not materially affect the basic and novel characteristic(s)" of the claimed invention. Thus, the term "consisting essentially of" as used herein should not be interpreted as equivalent to "comprising."

Moreover, the present disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure.

As used herein, "treatment", "therapy" and/or "therapy regimen" refer to the clinical intervention made in response to a disease, disorder or physiological condition manifested by a patient or to which a patient may be susceptible. The aim of treatment includes the alleviation or prevention of symptoms, slowing or stopping the progression or worsening of a disease, disorder, or condition and/or the remission of the disease, disorder, or condition.

The term "effective amount" or "therapeutically effective amount" refers to an amount sufficient to effect beneficial or desirable biological and/or clinical results.

As used herein, the term "subject" and "patient" are used interchangeably herein and refer to both human and nonhuman animals. In some embodiments, the subject comprises a rodent undergoing behavioral analysis using a system and/or method as prescribed herein.

Unless otherwise defined, all technical terms used herein have the same meaning as commonly understood by one of ordinary skill in the art to which this disclosure belongs.

Recent advancements have been made in video-based, three-dimensional animal movement analysis. One such advancement is described in a publication and incorporated herein by reference ("Geometric deep learning enables 3D kinematic profiling across species and environments", *Nature Methods*, Vol. 18, May 2021, 564-573). The previously described system, which can be referred to as DANNCE (3-Dimensional Aligned Neural Network for Computational Ethology) is a system for tracking movement in freely behaving animals using multiple cameras.

Examples described herein improve upon the concepts of DANNCE by expanding the video capture capabilities, increasing the reproducibility and portability, and reducing the complexity of the system. The disclosed system overcomes longstanding obstacles in animal research, enabling high-throughput, scalable screening for clinical drug development that has been previously unattainable.

It is initially noted that, although the examples described herein relate to mice, the systems and methods are equally applicable to other subjects that may be of interest for behavioral study or phenotyping. These include, but are not limited to, rats, marmosets, and other rodents, birds, amphibians, reptiles, etc. It is further envisioned that the systems and methods described herein can be scaled to observe, at least partially, human subjects.

One aspect of the present disclosure provides a system for kinematic profiling of free moving subjects. The system includes a transparent subject chamber, a high-resolution camera mounted below the chamber, and mirrors positioned around the chamber to provide several orthotropic views (e.g., five views) of the subject. The use of a single camera in combination with mirrors, rather than multiple independent cameras, advantageously reduces the complexity of the system and increases the fidelity of camera calibration procedures, which in a typical multi-camera setup needs to be run independently for each device.

FIG. 1 illustrates an example embodiment of a system 100 (e.g., an observation chamber) according to the present disclosure. System 100 comprises a housing 101, a behavioral arena 102 (e.g., a transparent chamber) having a roughly cubic or pyramid shape, a high-resolution camera 104 mounted below arena 102, and optical-grade mirrors 106 positioned along each face of arena 102 (mirror assembly seen from the rear in FIG. 1). System 100 optionally comprises a power source 108 and/or a computing platform 110. In the example embodiment of FIG. 1, a power supply 108A powers computing platform 110, and a separate power source 108B powers a light source 114. Other configurations will be evident to a person of skill in the art and are within the scope of the disclosure.

The housing 101 includes a plurality of support beams 118 forming a frame. The plurality of support beams 118 connect a support platform 120 to a top surface 122. The lower support platform supports, among other things, the computing platform 110. The support platform may have a width w1 of approximately 25 to 26 inches (shown in FIG. 3). The support beams have a height h2 of approximately 74 to 76 inches. The total height of the system 100 is approximately 76 to 80 inches. As the height of the system 100 is less than 80 inches and the width of the system 100 is less than 32 inches, the system 100 is capable of fitting within a standard door frame and is easily moved between rooms. Accordingly, the system 100 may be constructed outside of a laboratory room and may be moved between rooms, whereas traditional systems are too large to fit within standard doorways. In some instances, the housing 101 includes one or more wheels to provide for moving the system 100. The wheels may be lowered or raised to adjust the height of the housing 101.

A subject animal is deposited into and removed from arena 102 via an access lid 112 disposed in the top surface 122 of system 100. Lid 112 comprises any suitable optional features such as lifting cylinders, ventilation and viewing ports, a user handle, and the like (see, e.g., FIGS. 7A-7B).

Figure 2A:
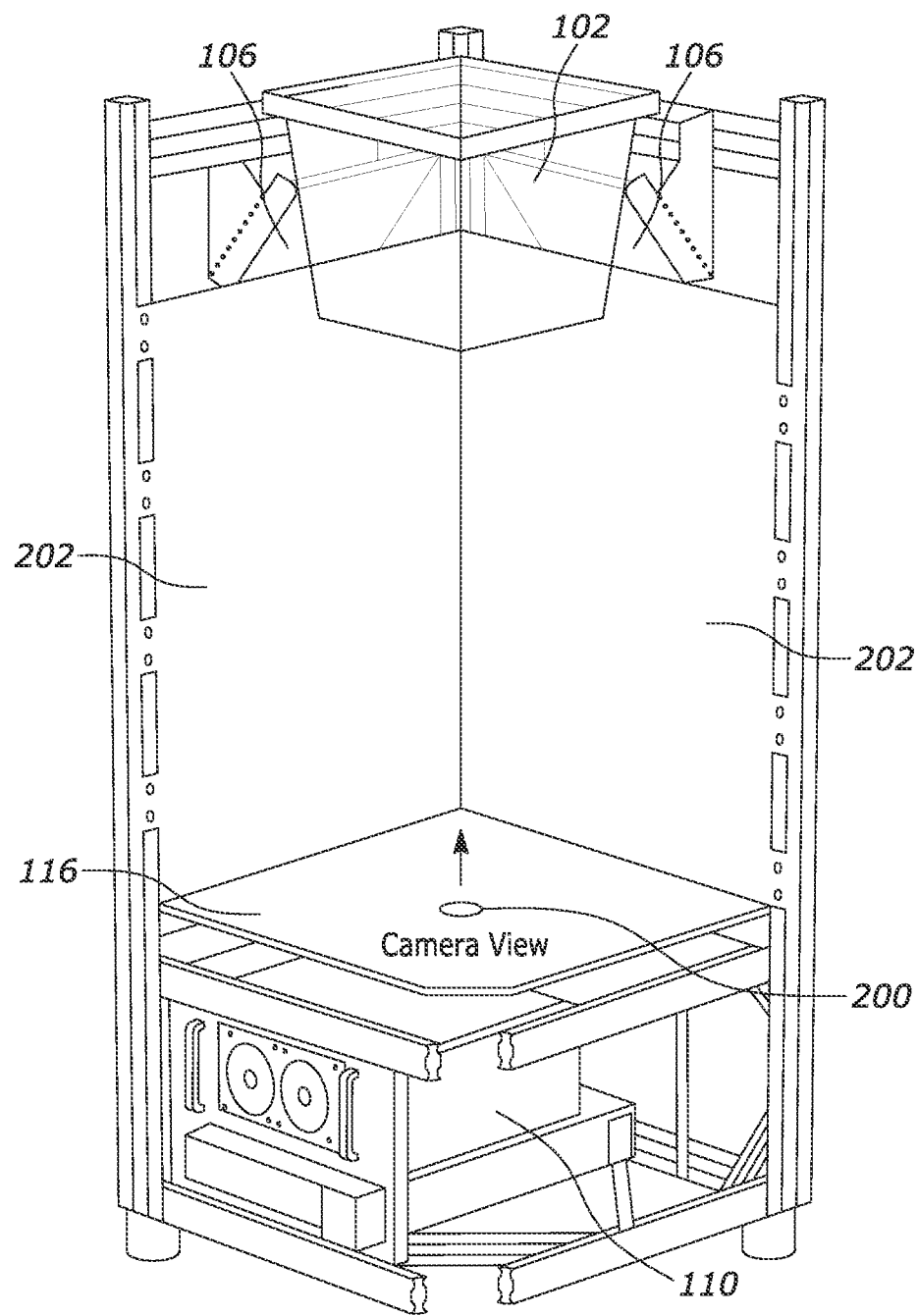
FIGS. 2A-2B are an illustration of an example usage of a system in accordance with one embodiment of the present disclosure.

In one embodiment, camera 104 is a monochromatic infrared (IR) camera, and mirrors 106 are IR-compatible mirrors. The mirrors 106 are positioned such that camera 104 can simultaneously capture five substantially orthographic projected views of a subject (e.g., a rodent) in arena 102, shown in FIGS. 2A-2B. Camera 104 can optionally be disposed beneath a surface 116 that has reflective properties and/or acts as a mounting surface for the camera lens or lenses.

Figure 5:
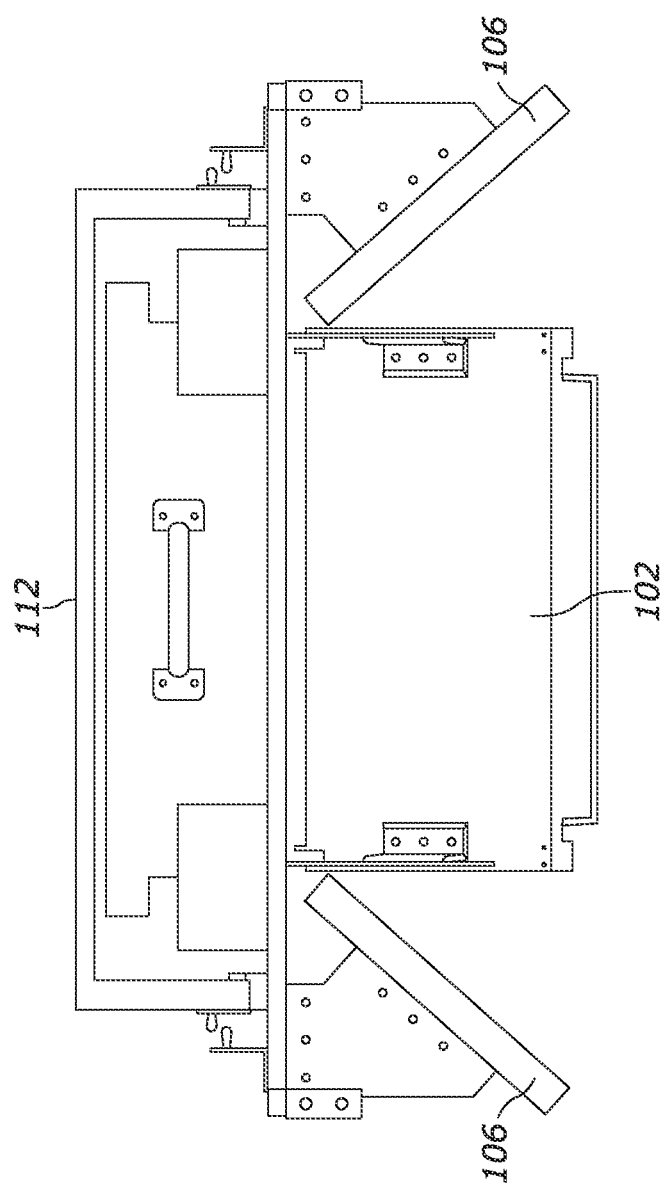
FIG. 5 is a side view of a mirror and lid assembly in accordance with one embodiment of the present disclosure.
Figure 6:
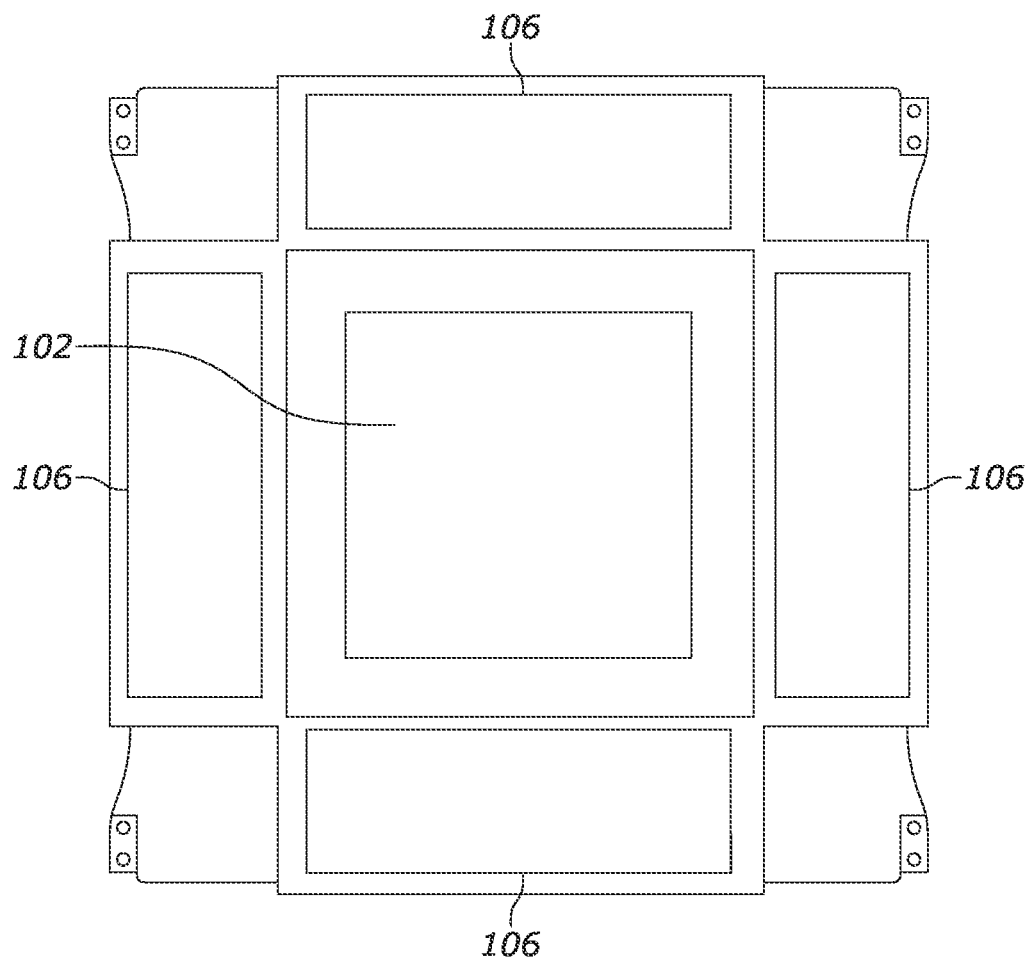
FIG. 6 is a bottom view of a mirror and lid assembly in accordance with one embodiment of the present disclosure.

The angle of each mirror 106 with respect to the arena 102 (see, e.g., FIG. 5) is critical to capturing simultaneous views. The angle is determined, at least in part, by the size of the arena 102 and the camera configuration (for example, the lens angle of the camera 104). As an example, the angle between the face of the mirror 106 and a horizontal reference can be 49.4 degrees. However, other reflection angles are possible. The reflection angle may be selected as an angle in which the mirrors 106 do not reflect into each other from the point of view of the camera 104, and an angle in which the light source 114 is not directly viewed by the camera 104. FIG. 6 illustrates a view of the arena 102 and the mirrors 106 from below. In some implementations, the walls of the arena 102 are tapered at an angle. This angle may be aligned with a lens angle of the camera 104.

Figure 3:
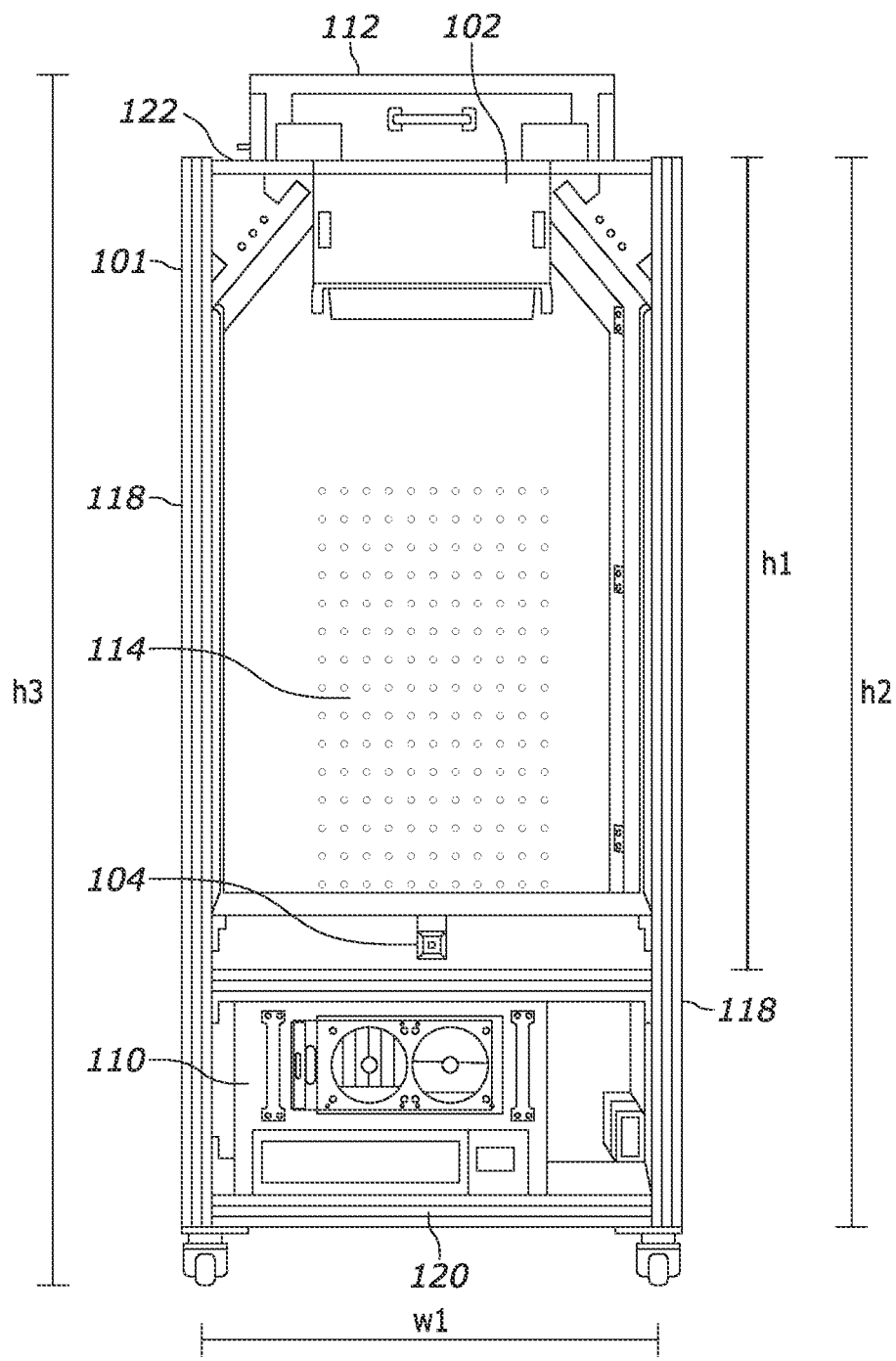
FIG. 3 is a side assembly view of a system in accordance with one embodiment of the present disclosure.
Figure 4:
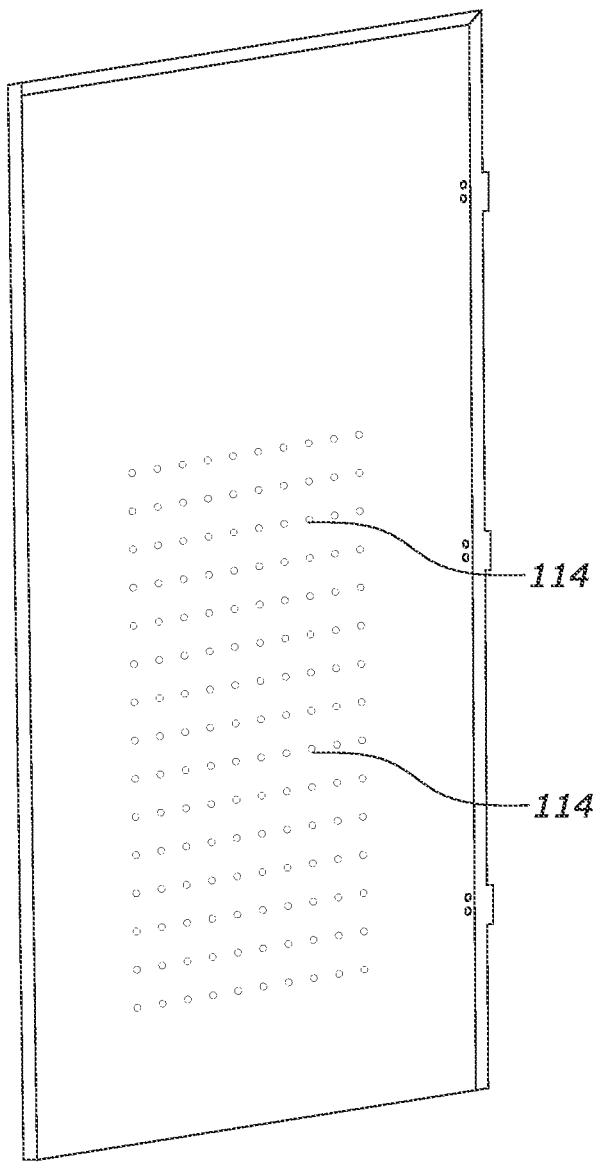
FIG. 4 is a door or wall component of a system in accordance with one embodiment of the present disclosure.

Subject lighting is provided by a light source 114, which is optionally an IR source having a wavelength of approximately 850 nm. This configuration advantageously allows the observation of reverse-light-cycle rodents in a dark environment, corresponding to their active phase. In the example embodiment of FIG. 1, light source 114 is a matrix of light-emitting diodes (LEDs) mounted on one or more walls (or doors) of housing 101 (see, e.g., FIG. 4). The doors may have a heigh h1 of approximately 50 inches (shown in FIG. 3). The lighting can be any suitable configuration to provide a uniform illumination of the subject. The walls of housing 101 may act as a heat sink for the light source 114. In such an instance, the walls may be aluminum.

Because the arena 102 is completely enclosed, the lighting conditions can be controlled to provide a clear field of view with minimal texture and lighting changes across all regions of interest. Further, the effect of ambient room light on the camera's field of view is eliminated, allowing for reproducible background, lighting, and optical settings. This reproducibility minimizes the need for neural network retraining and fine-tuning. This is currently one of the biggest obstacles encountered when first implementing a neural network for animal pose estimation. With existing techniques, some amount of fine-tuning is required to compensate for deviations in the background, lighting, and optical settings encountered across laboratories and experimental setups, even when implemented in the exact same species. The present disclosure addresses this deficiency. It further noted that, while infrared-based systems hold particular advantages, it is within the scope of the disclosure to incorporate conventional cameras, visible-range light sources and mirrors.

Figure 9:
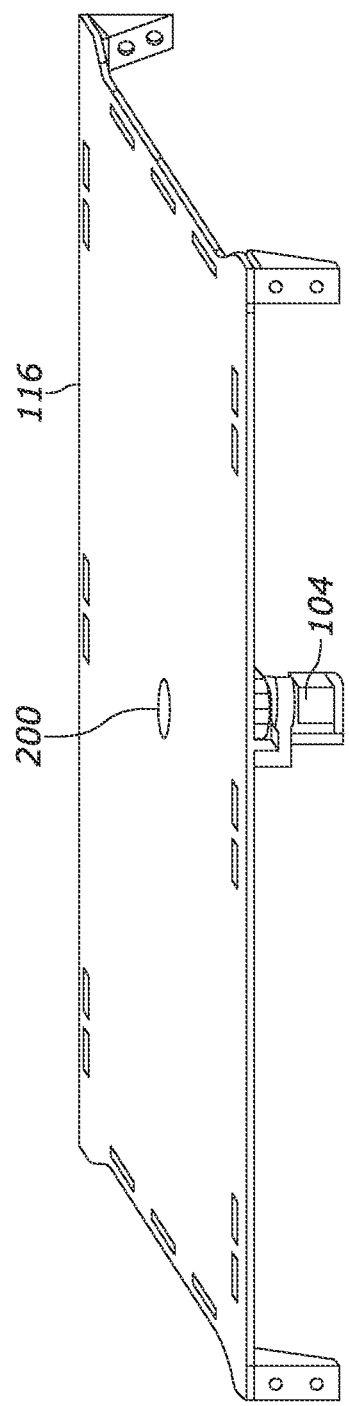
FIG. 9 is an isometric view of a camera assembly in accordance with one embodiment of the present disclosure.

In the example embodiment of FIGS. 1-3, camera 104 is disposed below arena 102 and faces upward through a camera viewport 200. This configuration provides an optimized view of a subject animal's paws, mouth, and tongue, which can be contributing features in a phenotype. With this configuration, system 100 can discern a number of subtle animal behaviors, such as hunching, rearing, grooming, toe standing, leaning, and others. In alternate configurations, the camera 104 and mirror orientation can be reversed to optimize viewing from above. FIG. 9 illustrates an example of the camera 104 situated below surface 116 and pointing towards camera viewport 200.

In an alternate embodiment, system 100 comprises a plurality of cameras 104. The cameras 104 can be mounted in an array below arena 102. The additional cameras 104 would operate similarly to a single camera 104 by capturing five fields of view per camera 104 using mirrors 106. In a non-limiting example, a second camera 104 would create ten fields, or five camera stereo pairs. Likewise, using N number of cameras 104 would result in 5*N fields of view. Some features of system 100 can be correspondingly adjusted to accommodate the additional cameras 104, such as the size of the arena 102 and/or the mirror angles of the mirrors 106.

Figure 7A:
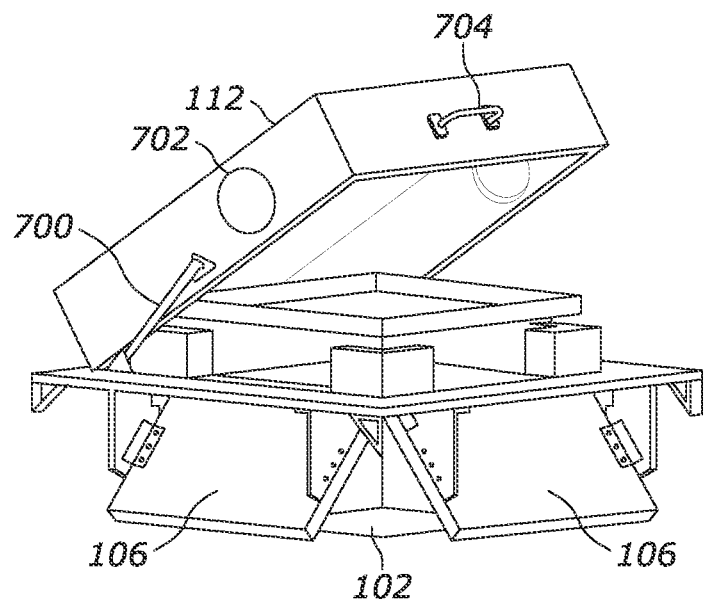
FIGS. 7A-7B are various isometric views of a mirror, area, and lid assembly in accordance with one embodiment of the present disclosure.
Figure 7B:
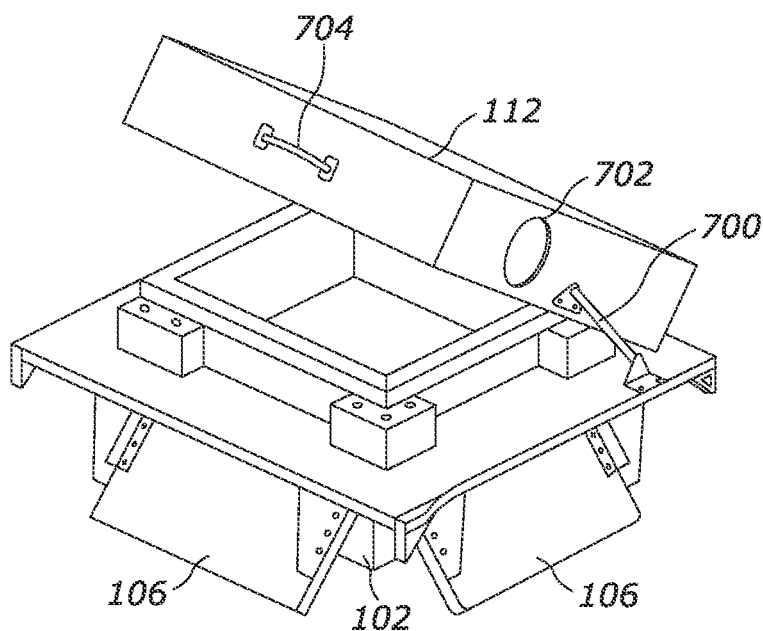

FIGS. 7A-7B illustrate perspective views of the lid 112 in an open position. In the open position the arena 102 is exposed and an animal may be placed within the arena 102. The lid 112 includes lifting cylinders 700 that allow the lid 112 to pivot between the open position and a closed position. The lifting cylinders 700 may hold or maintain the lid 112 in a placed position. For example, the lifting cylinders 700 are pressurized to maintain the lid 112 in the open position after the lid 112 is placed in the open position by a user. The lid 112 includes ventilation ports 702 to allow air to flow between the arena 102 and the outside environment. A handle 704 is mounted to a front of the lid 112 to allow a user to move the lid 112. However, the handle 704 may be situated on other areas of the lid 112 (for example, sides of the lid 112 or the top of the lid 112. The lid 112 may have a length of approximately 20 inches, a width of approximately 20 inches, and a height of approximately 5 inches.

Figure 8:
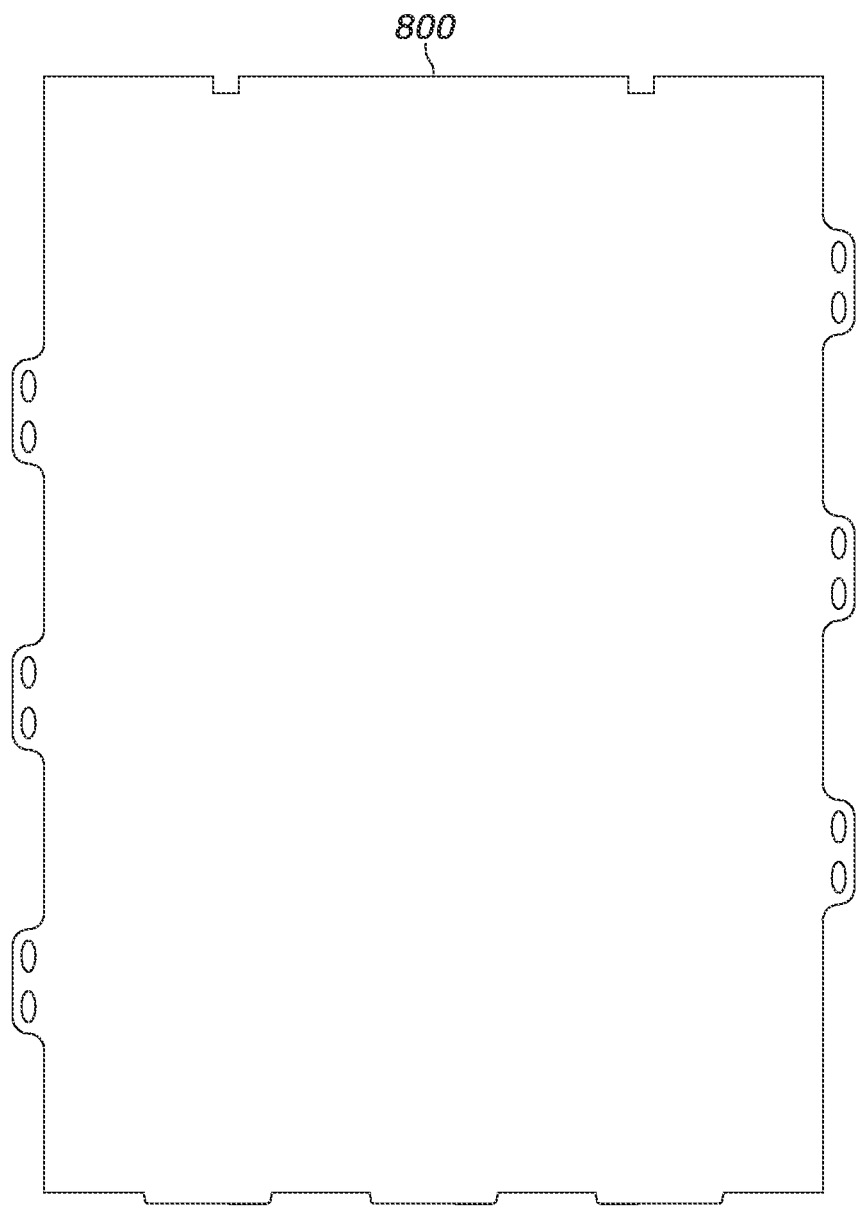
FIG. 8 is an illustration of a diffusive surface in accordance with one embodiment of the present disclosure.

In some instances, a diffuser 800 (an example of which is shown in FIG. 8) partially or fully covers the light source 114 to diffuse light projected by the light source 114. Accordingly, the diffuser 800 is mounted to the wall of the system 100 in which the light source 114 is situated.

Figure 2B:
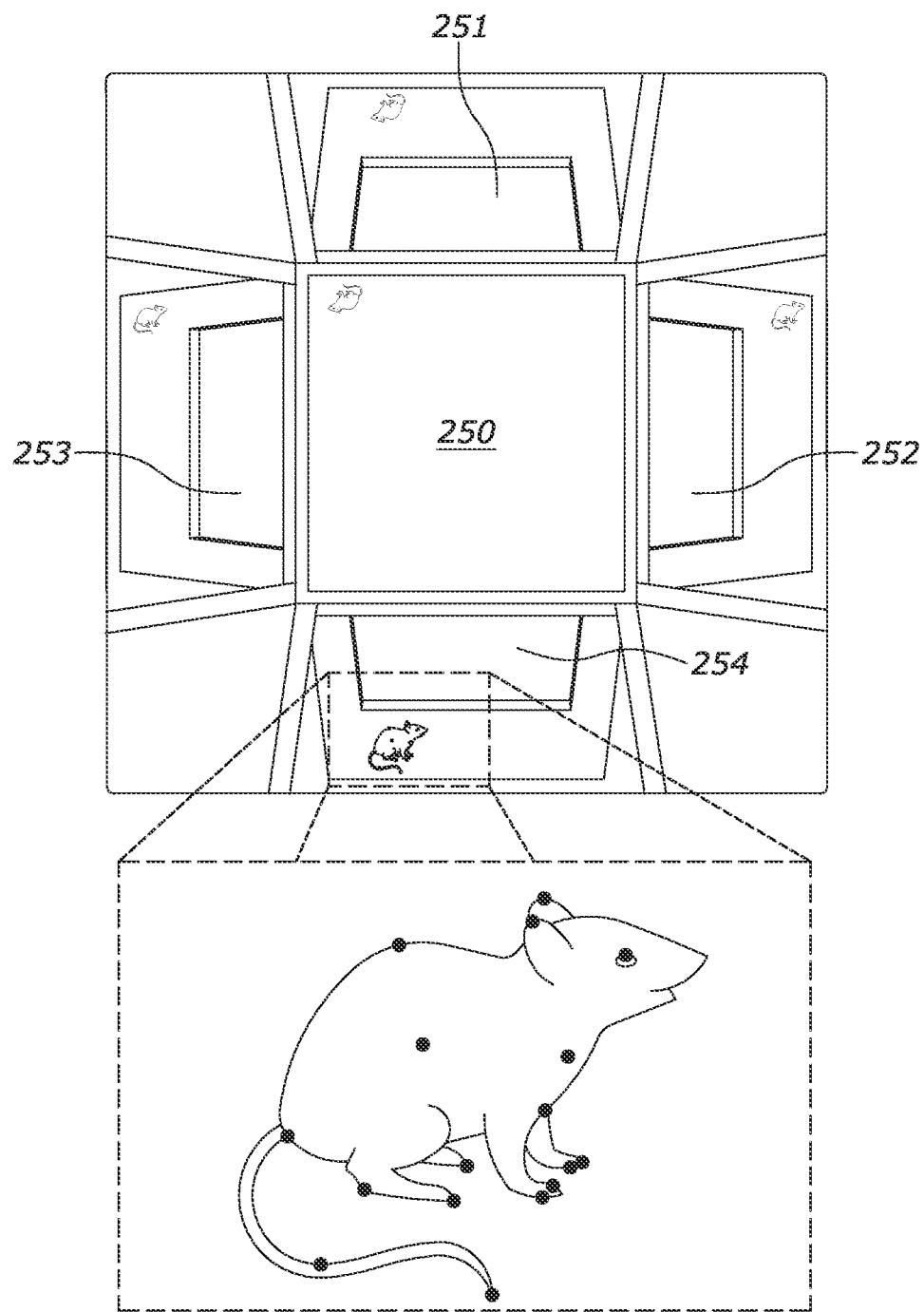
Figure 10:
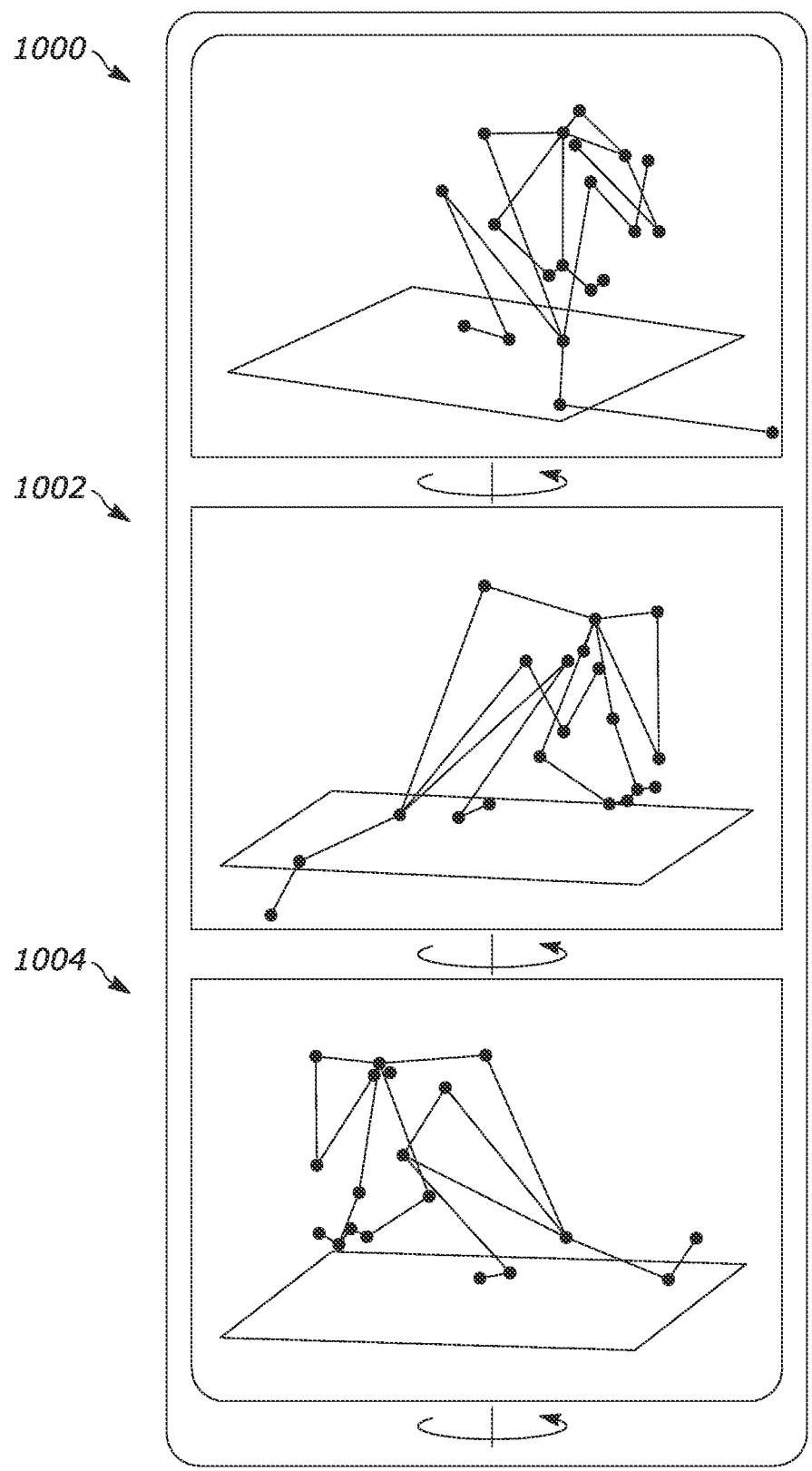
FIG. 10 is an example behavior reconstruction in accordance with one embodiment of the present disclosure.

Using the views of the mirrors 106 and the arena 102 captured by the camera 104, a customized computer algorithm determines the three-dimensional positions of prescribed virtual "markers" on the subject animal, depicted as dots on the animal in FIG. 2B. The markers correspond to landmarks on the body of the subject animal that are useful for creating a 3D reconstruction (see, e.g., FIG. 10). FIG. 10 provides a first view 1000, a second view 1002, and a third view 1004 of a mouse reconstructed using the markers of FIG. 2B. The system 100 thus captures postural dynamics at multiple temporal scales, which are decomposed into behavioral "syllables" and analyzed as described in further detail below.

Figure 11:
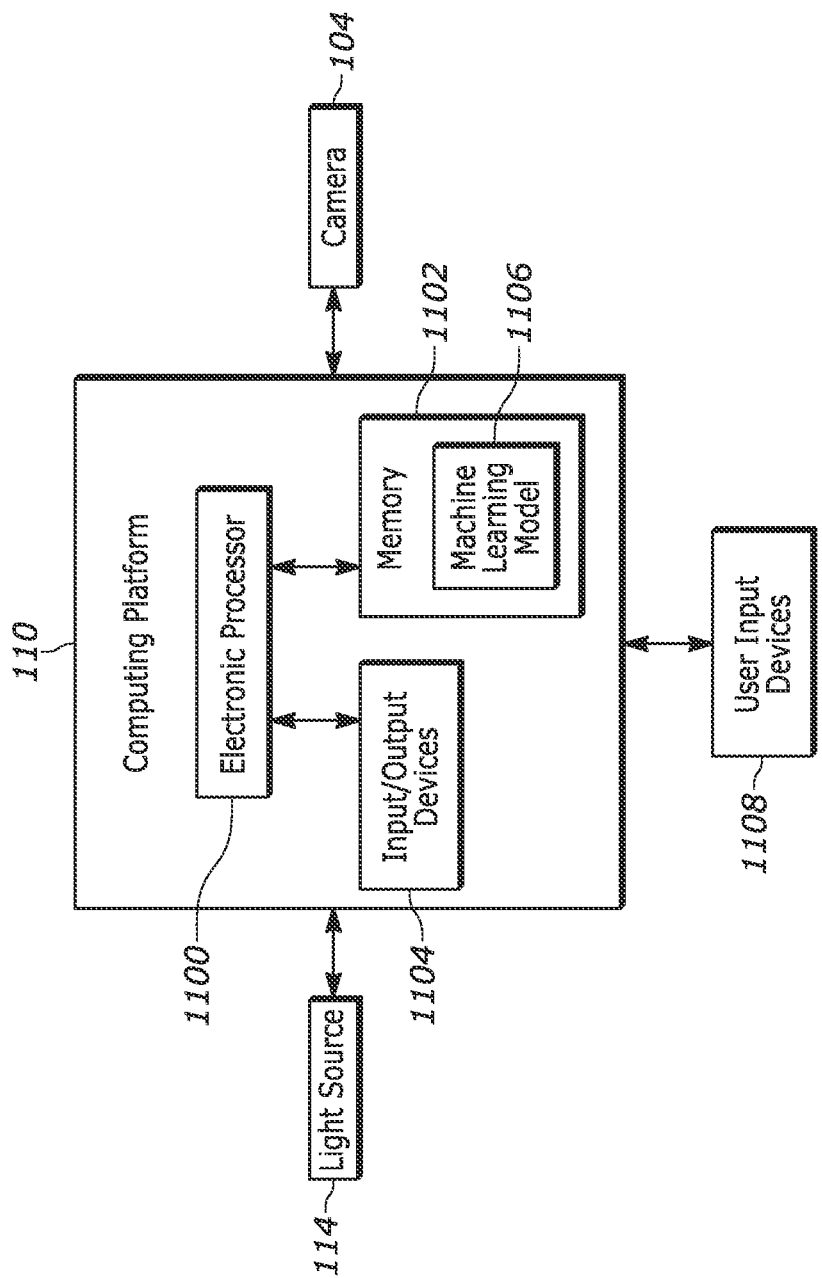
FIG. 11 is a block diagram of a computing platform for the system of FIG. 1 in accordance with one embodiment of the present disclosure.

FIG. 11 illustrates a block diagram of an example computing platform 110. The computing platform 110 includes, among other things, an electronic processor 1100, a memory 1102, and input/output (I/O) devices 1104. The electronic processor 1100, the memory 1102, and the I/O devices 1104 communicate over one or more control and/or data buses. In some examples, the electronic processor 1100 is implemented as a microprocessor with separate memory 1102. In other examples, electronic processor 1100 is implemented as a microcontroller, where memory 1102 is on the same chip. The electronic processor 1100 may be implemented with multiple processors, and may be implemented partially or entirely as, for example, a field-programmable gate array (FPGA) or an applications specific integrated circuit (ASIC).

The memory 1102 includes non-transitory, computer-readable memory that stores instructions that are received and executed by the electronic processor 1100 to carry out the functionality of the system 100 described herein. The memory 1102 may include, for example, combinations of different types of memory, such as read-only memory and random-access memory. The memory 1102 stores a machine-learning model 1106 that is implemented by the electronic processor 1100.

The computing platform 110 is also connected to the camera 104. The electronic processor 1100 is connected to the camera 104 via the I/O devices 1104. The electronic processor 1100 may control the camera 104 to record video and receives the video from the camera 104 for processing (for example, processing by the machine-learning model 1106). In some instances, the electronic processor 1100 is also connected to the light source 114 and controls the light source 114. In other instances, a separate light switch is provided on the housing of the system 100 to control the light source 114.

While not explicitly illustrated, the computing platform 110 may include other components, such as a transceiver or communication ports to communicate with an external device. For example, in some implementations, the electronic processor 1100 may receive video from the camera 104 and transmit the video to an external device for processing.

Another aspect of the present disclosure provides a computer-based algorithm that works in cooperation with system 100. The algorithm creates a stable 3D reconstruction of data captured by the imaging system. The algorithm may be incorporated in computing platform 110 or as a standalone/distributed system.

In general, the algorithm comprises elements configured to capture and retain native video of a freely-moving subject; process the video for analysis; and quantify a behavior based on the analyzed video.

Figure 12:
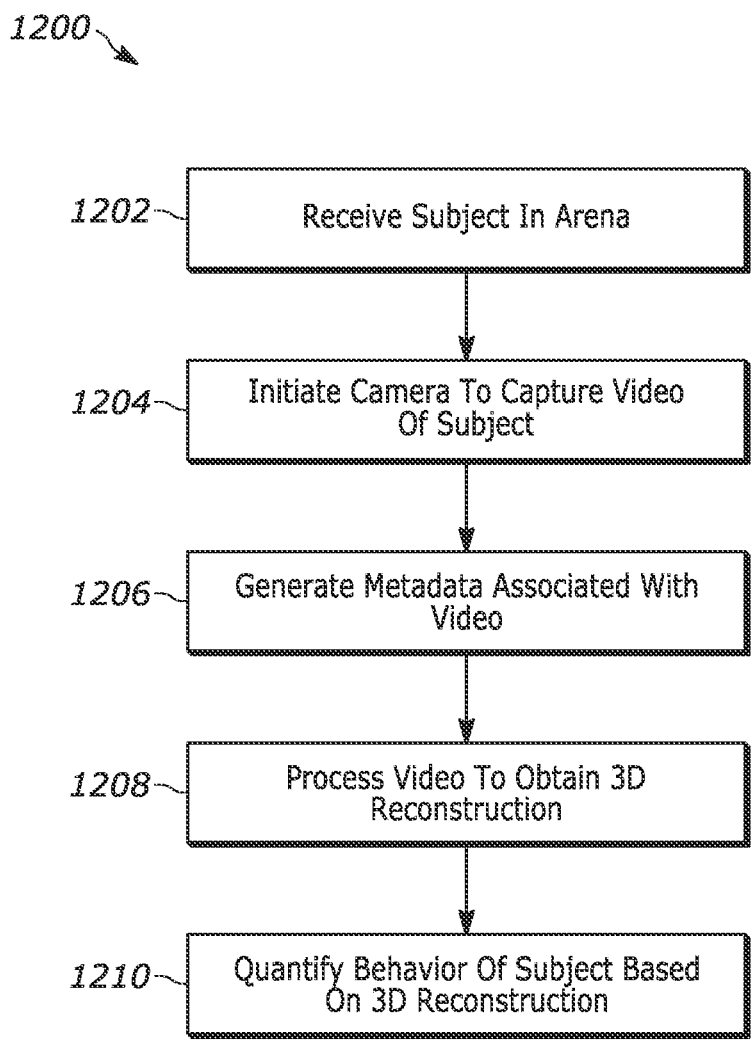
FIG. 12 is a block diagram of a method performed by the computing platform of FIG. 11 in accordance with one embodiment of the present disclosure.

FIG. 12 provides a method 1200 for operating the system 100. The method 1200 includes receiving a subject in the arena 102 (at step 1202). The method 1200 includes initiating the camera 104 to capture video of the subject in the arena 102 (at step 1204). The method 1200 includes generating metadata associated with the video of the subject (at step 1206). The method 1200 includes processing the video to obtain a 3D reconstruction of the subject (at step 1208). The method 1200 includes quantifying behaviors of the subject based on the 3D reconstruction of the subject (at step 1210).

The metadata generated at step 1206 assists in tracking the analysis of the subject. For example, the metadata may include a project name, a project duration, an identification number of the system 100, a date, a time, a name or number of the subject, and the like. After the behaviors of the subject are quantified (at step 1210), the behaviors may also be stored as metadata.

Video compression may be used to reduce the computing resources needed for storing and analyzing captured video. In a non-limiting example, a hardware-accelerated video encoding can be implemented with temporal adaptive quantization to achieve small file sizes without a noticeable loss in quality.

In particular, typical compression algorithms achieve no noticeable loss in quality when looking at an entire image, but not for a zoomed-in portion. However, since the subject is small compared to the arena, a zoomed-in image provides useful details. The present algorithm overcomes these challenges and is capable of zooming in to the subject during very fast motor movements and determining if there are features being lost. By using temporal adaptive quantization it is possible to achieve about the same sized video as default methods, but without noticeable loss when zoomed in.

As system 100 has consistent lighting and a neutral environment, this approach advantageously allows more memory to be dedicated to tracking changes in the subject's movement and less memory to recording the background. This creates a significant storage improvement, which is useful for archival purposes and ensures that the primary video is preserved for re-analysis as algorithms and hypotheses evolve over time.

The algorithm optionally comprises an architecture for managing dataflow during automated processes. A file structure can be organized such that the location of every file, its stage of analysis, and all the dependent files for each recording is known. Using this information, the algorithm is able to automatically run any uncompleted tasks. An automated trigger can be configured to run through any necessary preprocessing at prescribed intervals.

EXAMPLE

The VPS35 (D520N) mutation, found in multiple families, causes late-onset Parkinson's Disease. When introduced into mice, this mutation robustly produces progressive age-related, axon-first degeneration of nigral dopaminergic neurons, consistent with the pathological features seen in human Parkinson's Disease patients. Although these mutations produce tremor-predominant, dopa-responsive parkinsonism in humans, previous studies could not identify motor deficits in these VPS35 (D650N) mutant mice. Traditional motor phenotyping assays lack the sensitivity to robustly identify these deficits.

However, 3D motor phenotyping using DANNCE, combined with the system 100 described herein, is capable of detecting differences in the movements of wild type and VPS35 (D620N) mutant mice, as shown in FIGS. 13A-13D. Furthermore, embodiments described herein enable the identification of the most significant changes in behavior (grooming, rearing, and crouching), as shown in FIG. 14. These movements were not previously assessed using prior systems. Thus, the sensitivity of DANNCE implemented with system 100 provides an unbiased approach to identifying motor phenotypes in Parkinson's Disease.

Figure 13A:
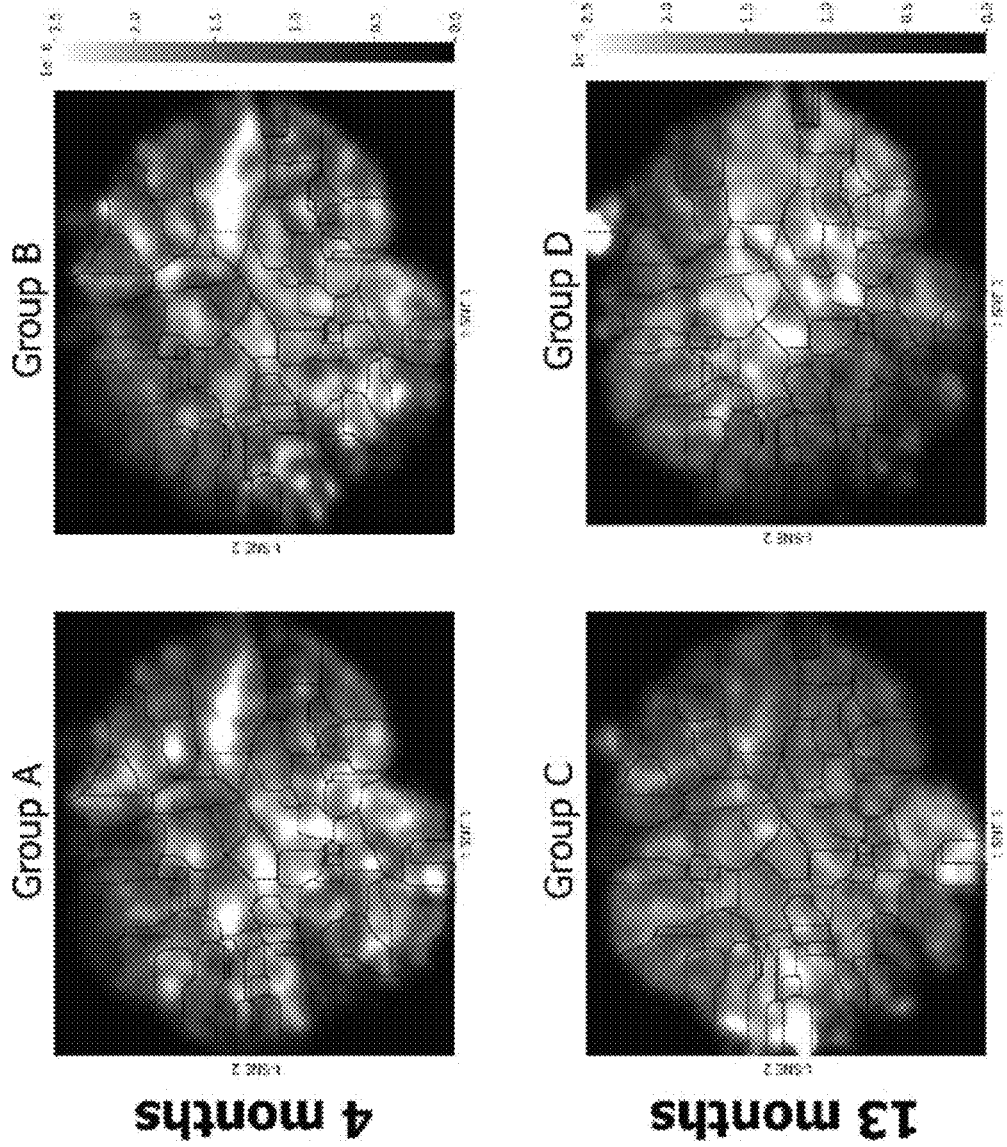
Figure 13B:
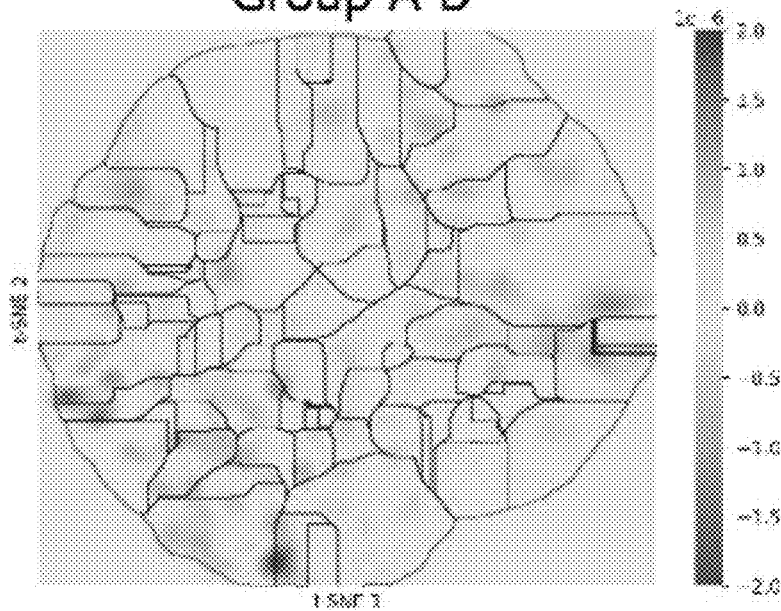
Figure 13B:
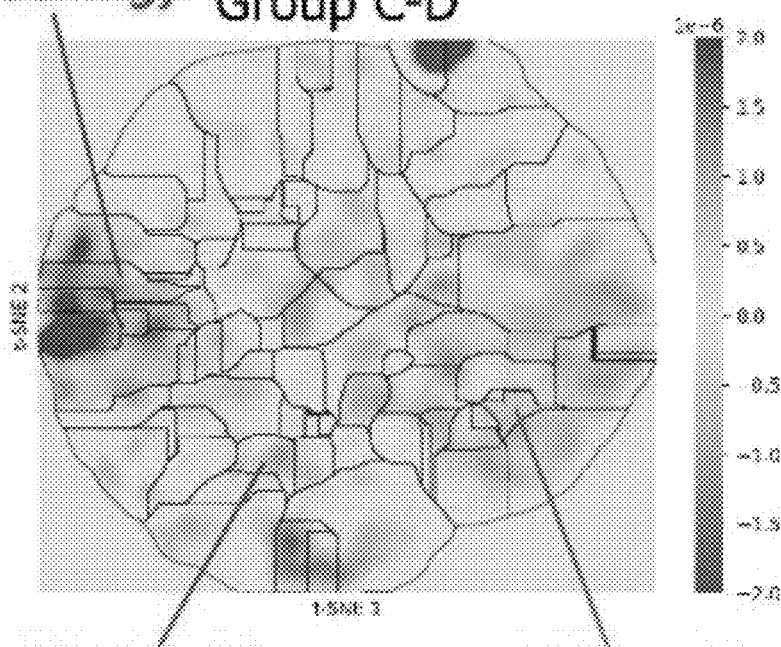

In FIGS. 13A-13D, DANNCE implemented with system 100 detects age-dependent motor phenotype in VPS35 (D620N) mice, and 90 different behavioral clusters were found after analyzing the DANNCE predictions of the body parts. In FIG. 13A, the fraction of time spent in each behavioral cluster is represented in a t-SNE heat map for each of the groups. Groups A and B represent 4 month old mice, while Groups C and D represent 13 month old mice. FIG. 13B illustrates a heatmap of differences between age-matched groups. More prominent changes are seen in the 13 month old mice compared to the 4 month old mice, consistent with the age-related pathologies found in the VPS35 (D620N) mice. Example clusters with the associated behavior are highlighted. These clusters were found to have the highest p-value, and also caused the largest changes in p-value when excluded from the statistical analysis (Panel 4).

Figure 13C:
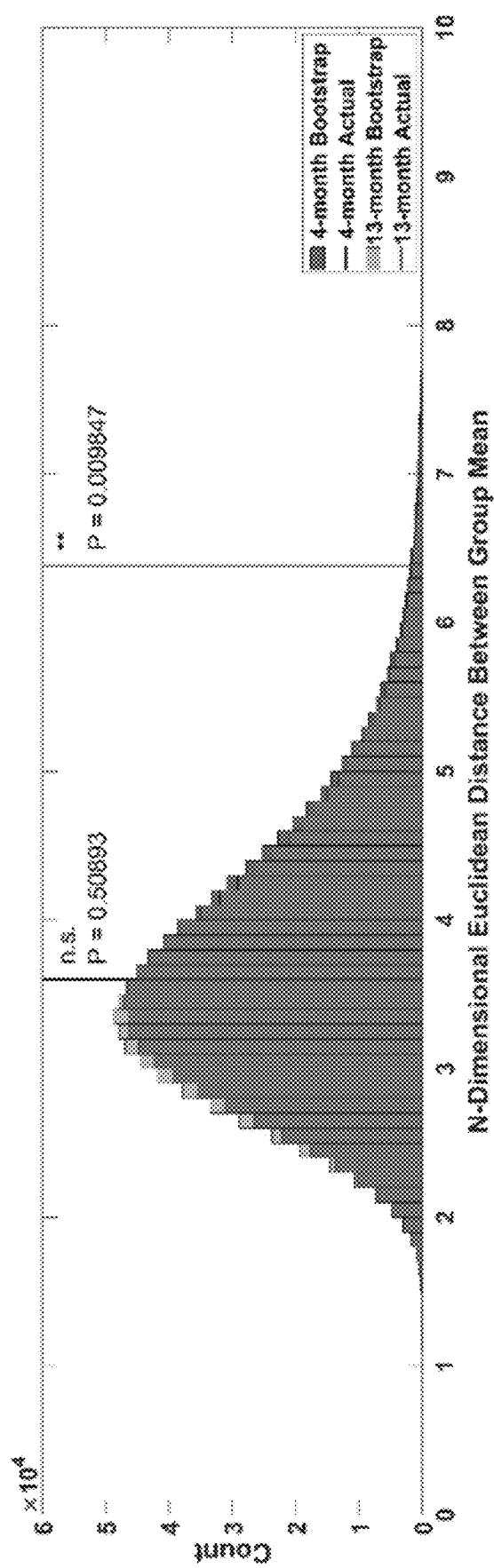
Figure 14:
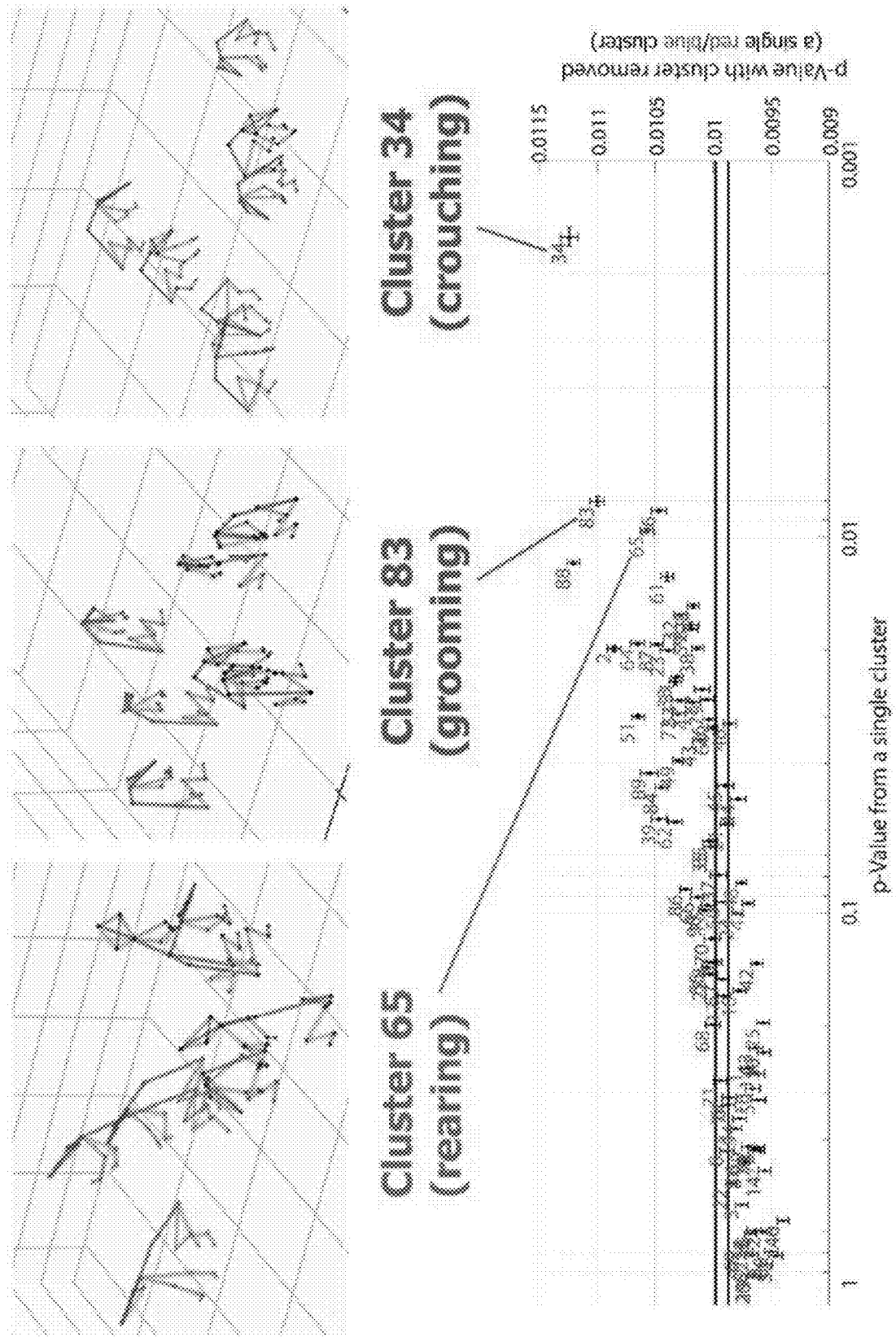
FIG. 14 is a graph of behavioral syllables in mutant mice.

FIG. 13C illustrates a histogram of bootstrapped test statistics used to demonstrate statistical significance between the groups. While the 4 month old mice did not show statistically significant changes, the 13 month old mice do show statistically significant changes, having a p-value of less than 0.01. FIG. 13D illustrates a table of the experimental design. Recordings and analysis were performed while blinded to the genotype of the mice. For each age group, there were two genotype groups, either wild type (no mutation) or VPS35 (D620N) mice. Mice were acclimatized and kept on a reverse light cycle and recorded in their dark (active) phase. Each recording captured by the camera 104 for each mouse in the arena 102 is an hour long.

FIG. 14 illustrates an analysis of behavioral syllables altered in VPS35 (D620N) mice. Examples of behavioral syllables that contributed the most to the differences between wild type and VPS35 (D620N) are shown. The importance of each cluster is defined in two ways: the p-value of the individual cluster between the two groups (x-axis) and the change in p-value after the cluster is excluded when comparing the two groups (y-axis). A relative decrease in rearing is detected with relative increases in grooming and crouching, as is consistent with changes expected in Parkinsonian mice.

Thus, embodiments described herein provide, among other things, an observation chamber for three-dimensional kinematic profiling of animals. Various features and advantages are set forth in the following claims.

What is claimed is:

1. A system for analyzing free-moving animal subject behavior, comprising:
a housing, wherein a height of the housing is less than 80 inches, and wherein a width of the housing is less than 32 inches;
a transparent arena coupled to the housing and configured to hold a subject;
a camera mounted below the arena; and
a mirror system mounted within the housing and configured to reflect multiple images of the subject in a single field of view of the camera.

2. The system of claim 1, wherein the mirror system includes four mirrors disposed orthogonally around the arena, and wherein the camera is configured to capture five simultaneous views of the subject.

3. The system of claim 1, further comprising:
a light source, wherein the light source is an infrared source, and wherein the camera is an infrared camera.

4. The system of claim 1, wherein the camera is a first camera of a plurality of cameras, wherein each camera of the plurality of cameras is configured to capture multiple images of the animal.

5. The system of claim 1, further comprising:
a lid covering the arena, wherein the lid includes a handle and a ventilation port.

6. The system of claim 1, wherein the arena is a cubic arena including a base and four walls.

7. The system of claim 6, wherein the four walls are tapered at an angle that aligns with a lens angle of the camera.

8. The system of claim 6, wherein the base has an area of approximately 26 inches by 26 inches.

9. The system of claim 6, wherein the arena has a height of approximately 36 inches.

10. The system of claim 1, further comprising an electronic processor configured to:
receive, from the camera, video of the subject;
analyze the video; and
quantify an animal behavior based on the analyzed video.

11. The system of claim 10, wherein the electronic processor is further configured to:
generate metadata associated with the analyzed video, wherein the metadata includes at least one selected from the group consisting of an arena identification number, a date, an animal identification, and a duration of the analyzed video.

12. A system for analyzing free-moving animal subject behavior, comprising:
a housing including a frame, a top surface, and a support platform;

a transparent arena configured to hold a subject, wherein the transparent arena is connected to the top surface;

a camera mounted below the arena;

a computing platform supported by the support platform, and a mirror system configured to reflect multiple images of the subject in a single field of view of the camera, wherein the mirror system surrounds the transparent arena.

13. The system of claim 12, wherein the mirror system includes four mirrors disposed orthogonally around the arena, and wherein the camera is configured to capture five simultaneous views of the subject.

14. The system of claim 12, further comprising a light source configured to illuminate the arena, wherein the light source is an infrared source, and wherein the camera is an infrared camera.

15. The system of claim 12, wherein the top surface includes a recess, and wherein the subject accesses the arena via the recess.

16. The system of claim 15, further comprising a lid configured to cover the recess.

17. The system of claim 12, further comprising a second surface situated between the top surface and the support platform, wherein the camera is situated below the second surface.

18. The system of claim 17, wherein the second surface includes a camera viewport.

19. The system of claim 12, wherein the arena is a cubic arena including a base and four walls, and wherein the four walls are tapered at an angle that aligns with a lens angle of the camera.

20. The system of claim 12, wherein the computing platform includes an electronic processor configured to:

receive, from the camera, video of the subject;

analyze the video; and quantify an animal behavior based on the analyzed video.

\* \* \* \* \*